May 19, 1953

P. C. EMARD 2,638,859

MACHINE FOR MAKING COAXIAL CABLE

Filed Oct. 30, 1948

INVENTOR
PAUL CHARLES EMARD
BY Adams + Bush
ATTORNEYS

May 19, 1953  P. C. EMARD  2,638,859
MACHINE FOR MAKING COAXIAL CABLE
Filed Oct. 30, 1948  8 Sheets-Sheet 2

INVENTOR
PAUL CHARLES EMARD
By Adams & Bush
ATTORNEYS

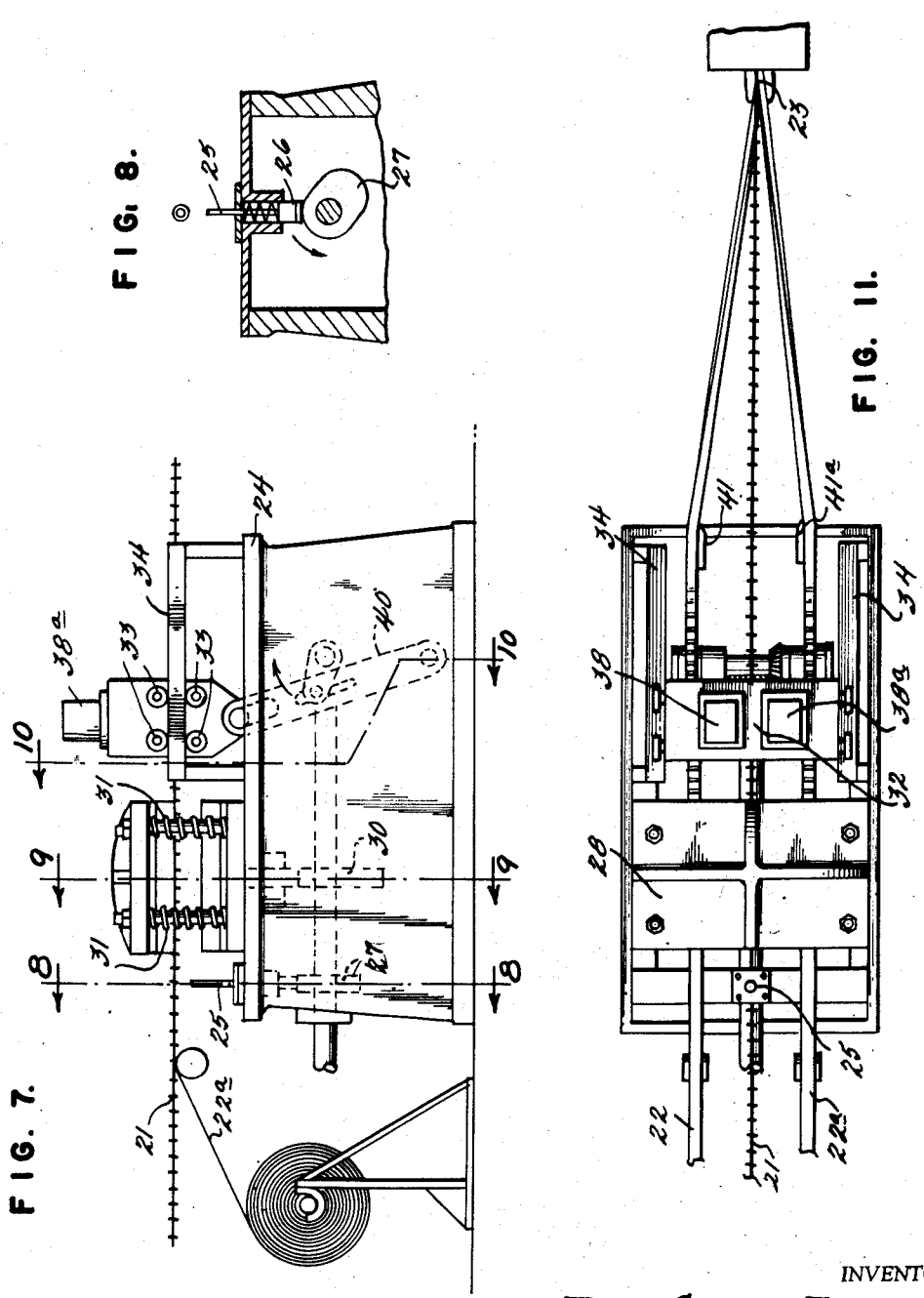

May 19, 1953 P. C. EMARD 2,638,859
MACHINE FOR MAKING COAXIAL CABLE
Filed Oct. 30, 1948 8 Sheets-Sheet 4
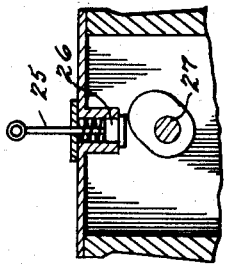
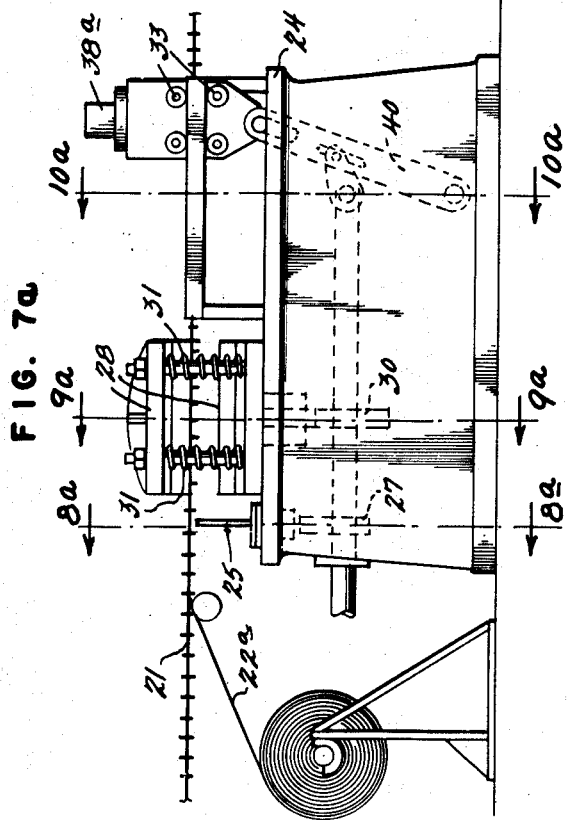
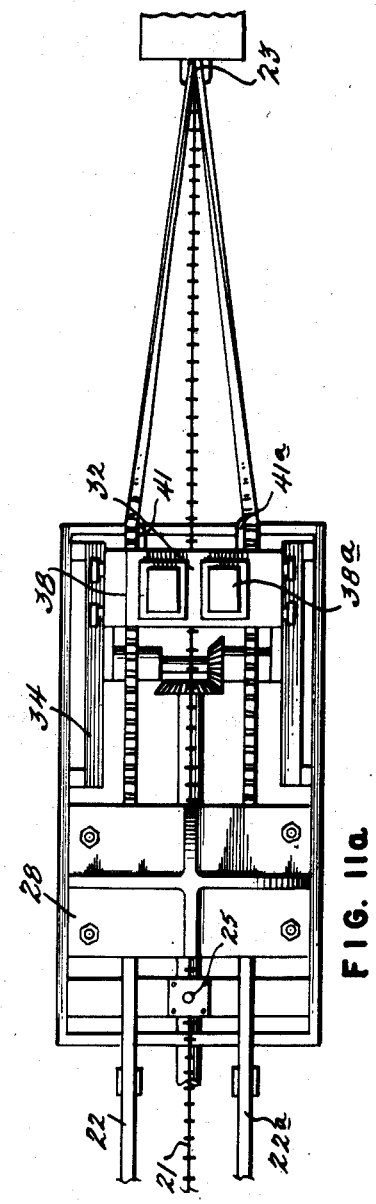
INVENTOR
PAUL CHARLES EMARD
BY Adams + Bush
ATTORNEYS May 19, 1953
P. C. EMARD
2,638,859
MACHINE FOR MAKING COAXIAL CABLE
Filed Oct. 30, 1948
8 Sheets-Sheet 5
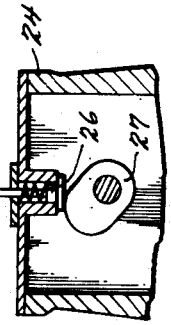
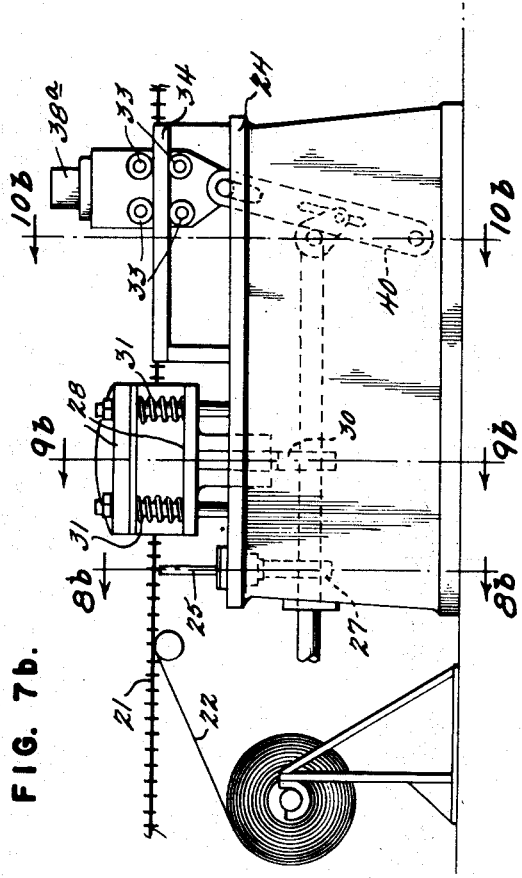
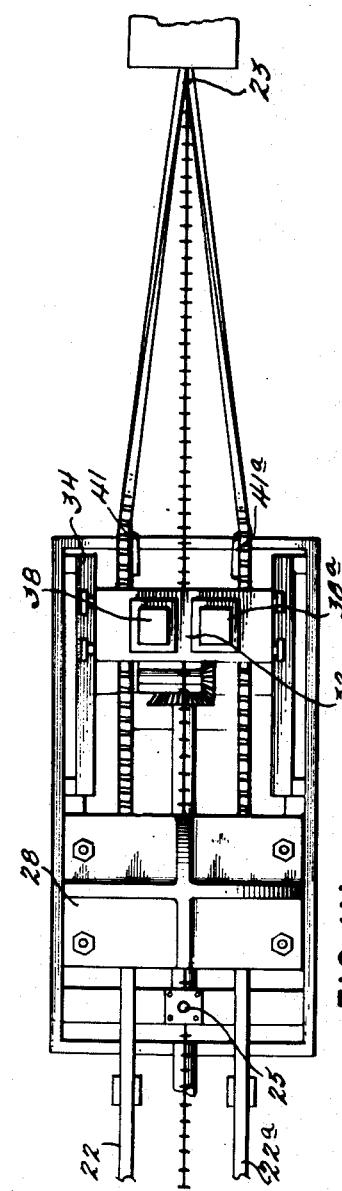
INVENTOR.
PAUL CHARLES EMARD
BY
Adams + Bush
ATTORNEYS May 19, 1953 P. C. EMARD 2,638,859
MACHINE FOR MAKING COAXIAL CABLE
Filed Oct. 30, 1948 8 Sheets-Sheet 6
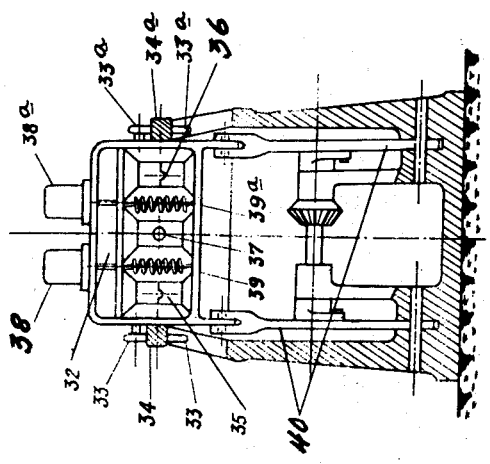
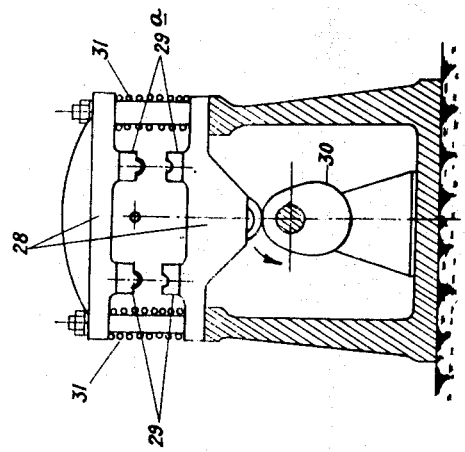
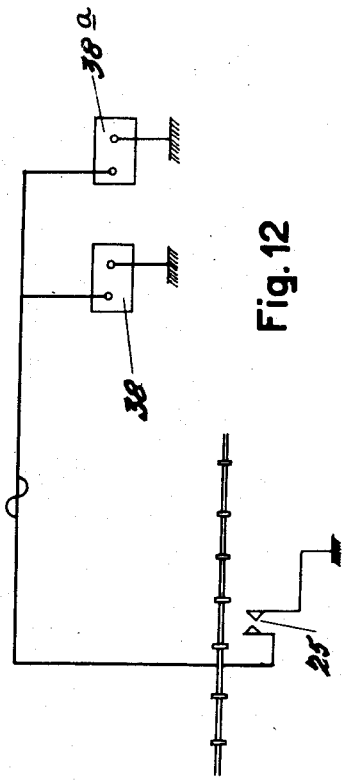
INVENTOR
PAUL CHARLES EMARD
By Adams & Bush
ATTORNEYS May 19, 1953 P. C. EMARD 2,638,859
MACHINE FOR MAKING COAXIAL CABLE
Filed Oct. 30, 1948 8 Sheets-Sheet 7

INVENTOR
PAUL CHARLES EMARD
By Adams & Bush
ATTORNEYS

May 19, 1953  P. C. EMARD  2,638,859
MACHINE FOR MAKING COAXIAL CABLE
Filed Oct. 30, 1948  8 Sheets-Sheet 8

INVENTOR
PAUL CHARLES EMARD
By Adams & Bush
ATTORNEYS

Patented May 19, 1953

2,638,859

UNITED STATES PATENT OFFICE 2,638,859

MACHINE FOR MAKING COAXIAL CABLE

Paul Charles Emard, Lyons, France, assignor to Compagnie Generale d'Electricite, Paris, France, a French joint-stock company Application October 30, 1948, Serial No. 57,451 In France January 24, 1945

2 Claims. (Cl. 113—33)

This invention relates to coaxial cables provided with insulating blocks. This application is in part a continuation of copending application Ser. No. 697,720 filed September 18, 1946, now abandoned.

One of the purposes of this present invention consists in an operation in which the central conductor of the coaxial cable is firstly made integral with the insulating blocks and then is surrounded by a tubular body constituting the external concentric conductor, the latter being formed of two metal strips shaped into casings by dishing or die stamping or pressing.

During this latter operation the concentric conductor is furnished with grooves to ensure its flexibility and between which are positioned the blocks. The term housings will be used hereinafter to designate the parts of the external conductor to which are applied the blocks.

In order to ensure the correct arrangement of the central conductor in the tubular body, it is necessary to produce, on the dished metal strips, spacings for the housings intended for the blocks precisely equal to the spacing of these blocks on the central conductor.

On the other hand, the various elements of the cable are conducted through the arrangement in such manner that at the junction point of the casings and of the wire provided with blocks, the latter fit well in their respective housings.

According to one embodiment of the present invention, the central conductor and the strips intended to form the external conductor are displaced at the same speed, the former in front of a locating point, the others in front of a dishing device driven in such manner as to provide a housing for a block at the instant at which such block comes to lie in front of the location point.

In this embodiment the central conductor furnished with its blocks and the strips to be dished are translated in parallel, the dishing device being controlled by a device functioning upon the arrival of each block in a vertical locating plane.

In this same embodiment there have been provided for the respective drive of the central conductor and of the strips of the external conductor, jaws mounted on a mutual support transmitting thereto the forward drive: these jaws open suddenly so as to stop the driving motion under the effect of electromagnets excited upon the passage of a block in front of a contactor placed then in the locating plane and controlling the energization of the electromagnets.

This present invention also provides for another embodiment of the arrangement for producing coaxial cables provided with insulating blocks, which is characterized substantially by the arrangement upon one and the same support of the driving and transmission devices for the movement of the contactor switch working in conjunction with the blocks, of a dishing or die stamping press to shape the strips into casings, a carriage bearing the jaws to convey the wire furnished with blocks and strips, and electrically operated brakes acting upon the said jaws.

Other particulars of this present invention will be described hereinafter:

Figs. 7–12 show for one embodiment of the principle illustrated in Figs. 1–6, the successive positions at successive operating steps.

Figure 1:
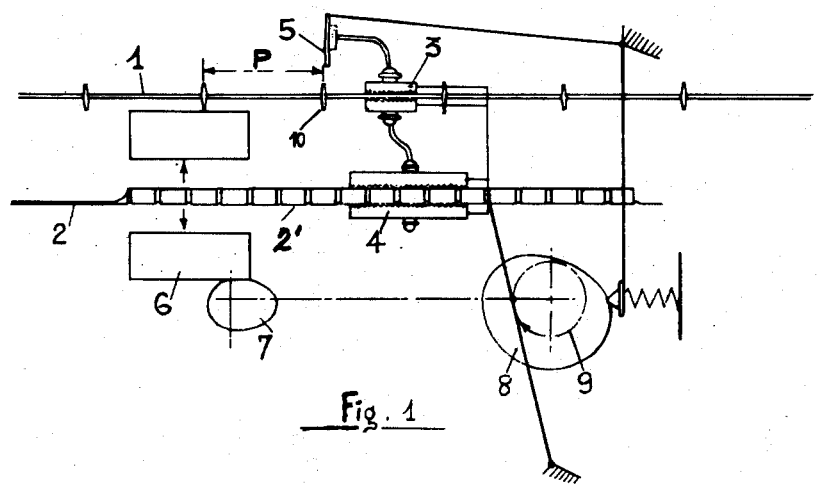
Figs. 1 to 5 show, in the different phases of operation, schematic diagrams illustrating the principle of operation of one particular embodiment given by way of example of the arrangement in conformity with this present invention.

The central conductor of the cable shown at 1 is provided in advance, with insulating blocks 10, then is surrounded by the tubular body provided with recesses which forms the external concentric conductor of the cable.

Two metal strips to form the parts of the external conductor are located simultaneously at the input of the dishing presses. One of these metal strips 2 and one of the dishing presses 6 only, have been shown in Figs. 1–6. The central conductor 1 and the metal strips 2 are subjected to step-by-step displacement of a length L (not shown) slightly greater than a distance equal to the product of $n$ times the space $p$ between two successive blocks, this number $n$ being a whole number and may be equal to unity as in the case shown in the drawing in which the distance of forward travel at each step is substantially equal to the space $p$ between two successive blocks 10, 10. If $n$ is equal to 2, the distance of forward travel at each step is substantially equal to twice the space between two successive blocks.

Figure 6:
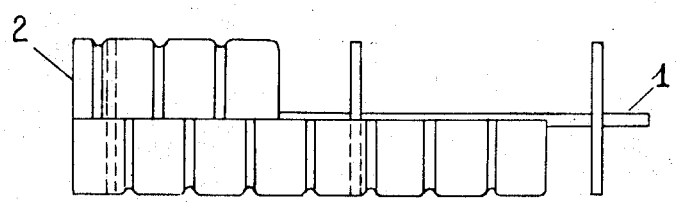
Fig. 6 shows a partial view of the coaxial cable with insulating blocks, to show the housings for the insulating blocks.
Figure 10A:
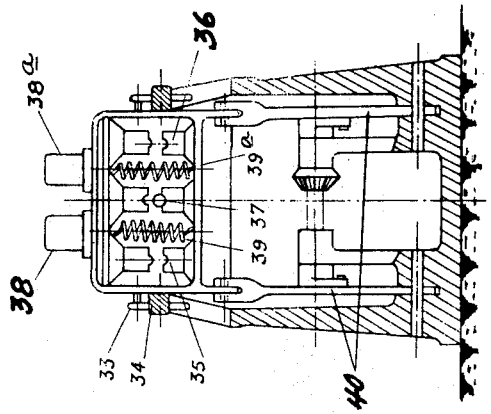

This displacement of length L is effected by action of the jaws, one jaw, 3, for the central conductor, and one, 4, for each external conductor strip. These jaws are mounted on one and the same support which causes their advance, actuation taking place after dishing. The jaws are arranged so as to open even if the jaw support has not completed its entire displacement L, at the precise moment in which an insulating block 10 of the order $n$, terminating one step of forward travel, passes into a vertical locating plane which is that of the contactor 5 shown in the drawing. The metal strips 2 having completed a displacement L, are dished or die stamped by the punch 6' cooperating with the die 6, these parts being driven by the cam 7 mounted on the same shaft as the cam 8. Thus perfect registration is ensured between the location of an insulating block and that of the corresponding housing which in the example shown may be positioned at any desired distance between two of the successive recesses 11 of the casing 2' as shown in Fig. 6. The jaws may be opened at the precise moment of the passage of the insulating block of order $n$, which terminates one step of forward travel, in the plane of location, by means of a contactor the particular characteristics of which are disclosed hereinafter.

The jaws 3, 4, gripping the central conductor 1 and the casings 2' during the forward thrust, may open under the action of electromagnets the energization of which is caused by the closure of the contactor 5 under slight thrust from the block 10 of the order $n$. This contactor is mounted on an arm only capable of moving in a plane perpendicular to the dishing machine 6, and under the influence of a cam 8 the setting of which is such that this arm leaves the working position when the forward movement is about to be effected and approximates that position as soon as the insulating block of order $n-1$ has passed into its plane, in such manner that the contactor is then ready to be operated by the block of the order $n-1$.

It has been stated already that the step-by-step displacement of length L (not shown) corresponds substantially to $n$ times the space $p$ between two successive insulating blocks; when, contrary to the case shown in Fig. 1, this number $n$ differs from unity, the contactor 5 must only be actuated upon the arrival of the particular blocks which are to control the dishing device. The displacement of the contactor under the action of the cam 8 allows of the passage of the intermediate blocks preceding the block of order $n$ in such manner that they are inoperative. Figs. 1 to 5 show the successive positions of the elements of the arrangement during operation.

Figure 2:
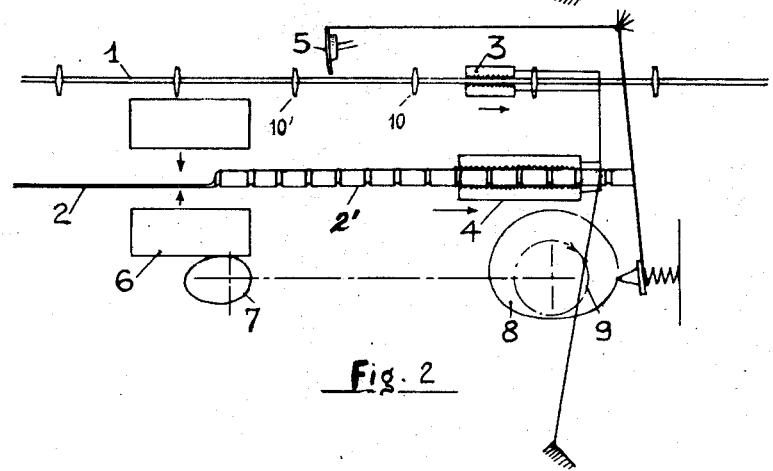

Figs. 1–5 show in order, the various successive operations. In Fig. 1 the dishing being completed, the contactor 5 is raised to allow to pass the insulating block 10 which has initiated the preceding operation. The jaws 3 and 4 are closed to allow the start of the forward motion. In Fig. 2 the insulating block 10 has passed beyond the level of the contactor 5. The latter takes up its position again ready to be subjected to the action of the following insulating block 10'.

Figure 3:
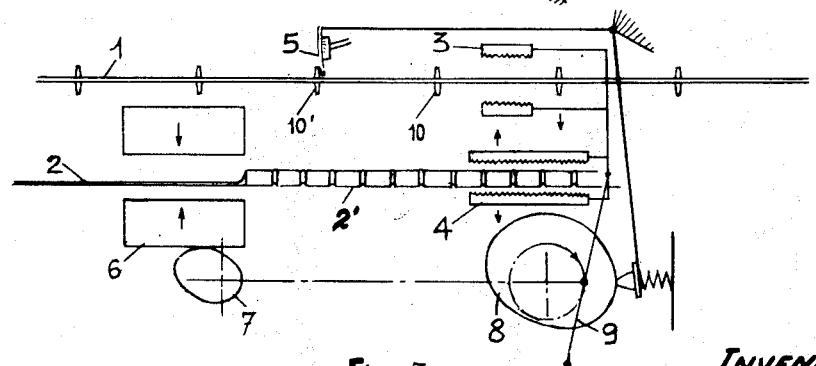
Figure 4:
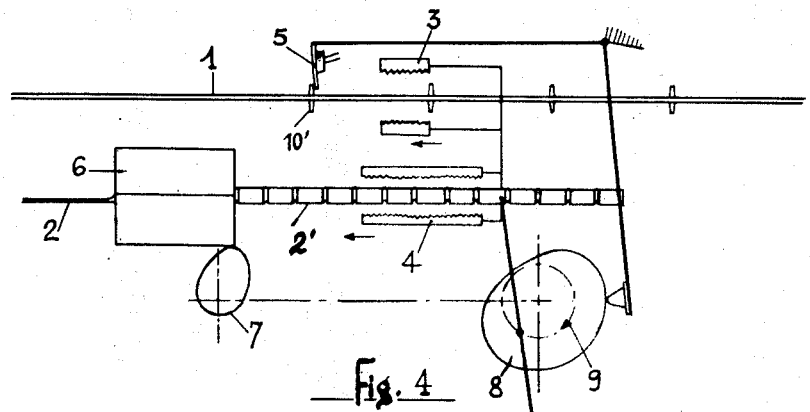
Figure 5:
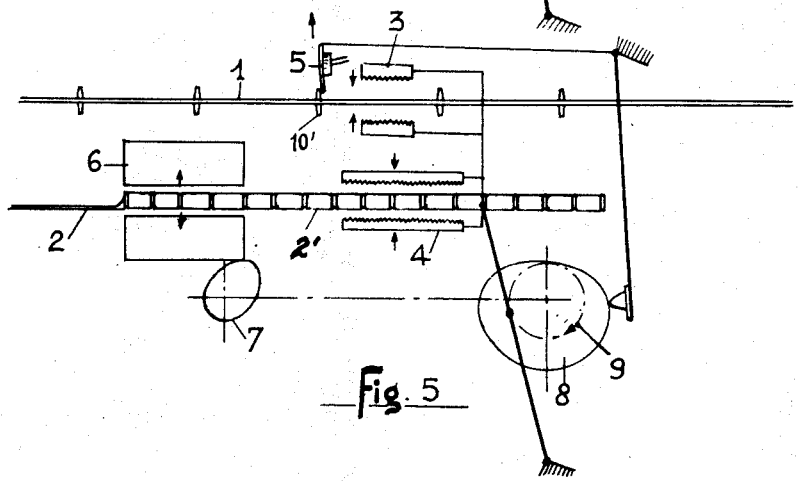

In Fig. 3 the contactor 5 having been contacted by this insulating block 10', the jaws open and the forward motion stops. Fig. 4 shows the dishing period, during which the open jaws return to their initial position. Fig. 5 shows the conclusion of the dishing period. The jaws 3, 4, having returned to their initial position, reclose and the contactor 5 is released.

Figs. 7 to 12, 7a to 12a and 7b to 12b show in detail respectively the structure and position of the various devices of this embodiment:

(1) (Figs. 7–12) at the instant in which the dishing is concluded
(2) (Figs. 7a–12a) at the instant in which towards the end of the forward stroke, an insulating block strikes the contactor switch and
(3) (Figs. 7b–12b) during the entire time of the dishing or die pressing, the jaws provided to grasp the central wire and casings being open.

Figs. 7, 7a, 7b show the machine seen in elevation while Figs. 8, 9 and 10, 8a, 9a, 10a, 8b, 9b, 10b, are respective sections according to the lines AA, BB, and CC of Figs. 7, 7a or 7b. Figs. 11a, 11b, show a plan view of the apparatus, Figs. 12, 12a, 12b, being the circuit arrangement of the contactor switch and electrically operated brakes.

As in the schematic drawings shown in Figs. 1 to 5, the machine to which this embodiment of Figs. 7–12 relates, is supplied with the wire 21 furnished with insulating plates and the metal strips 22 and 22a to be made with casings the whole being assembled at the output to form the coaxial cable 23.

In Figures 7–12, the machine comprises a table 24 carrying the essential parts of the apparatus and the transmission, a contactor switch 25 mounted on a sliding rod 26 driven by a cam 27, a dishing die stamping press 28 for making the strips 22 and 22a into casings and furnished with two sets 29 and 29a of punches and dies, the closing of these sets being effected by the cam 30 and the opening by the springs 31, and finally a carriage 32 is provided furnished with sheaves 33 allowing it to move over longitudinal bars 34.

In the movement of carriage 32, the pivoting lever 40 is engaged by an arm which effects a rotating movement by means of pinions, the attack pinion being mounted on the same shaft as the cams 27 and 30. The cams are given a suitable contour, and are properly keyed on the shaft to obtain the manner of operation desired.

This carriage is provided with three jaws 35, 36 and 37 the lower parts of which are fixed and the upper movable, to open under the action of electrically operated brakes 38 and 38a and to close again under the action of the springs 39 and 39a as soon as the electrically operated brakes no longer act.

Figure 12A:
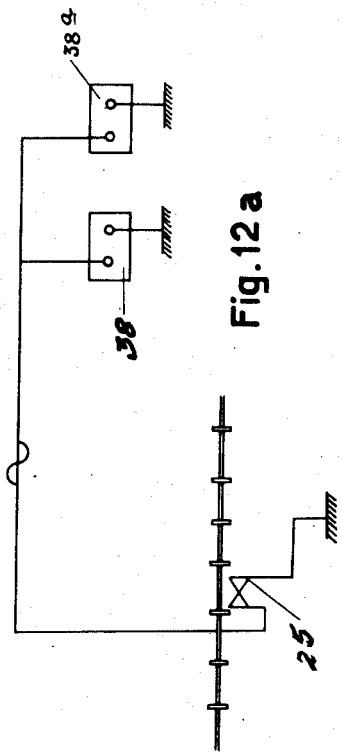
Figure 9A:
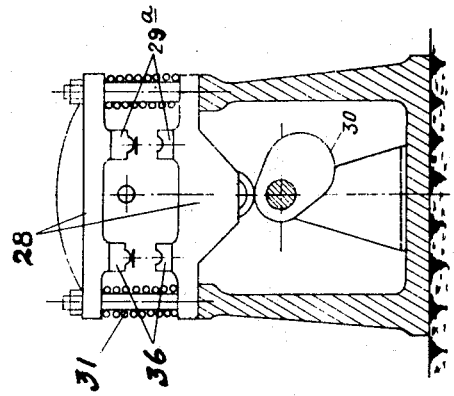
Figure 10B:
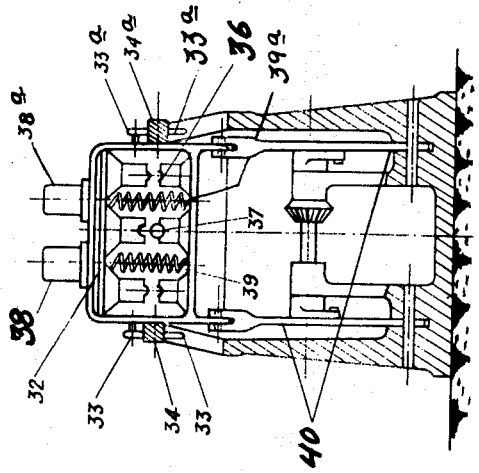
Figure 9B:
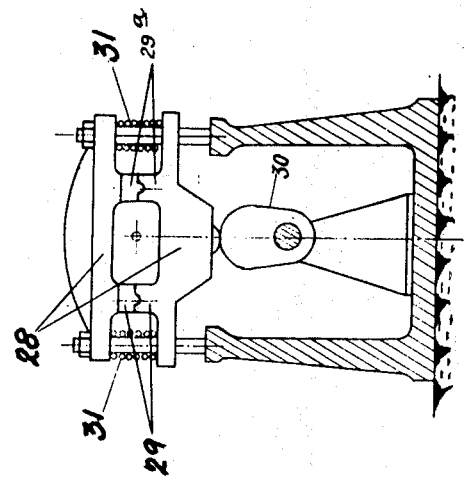
Figure 12B:
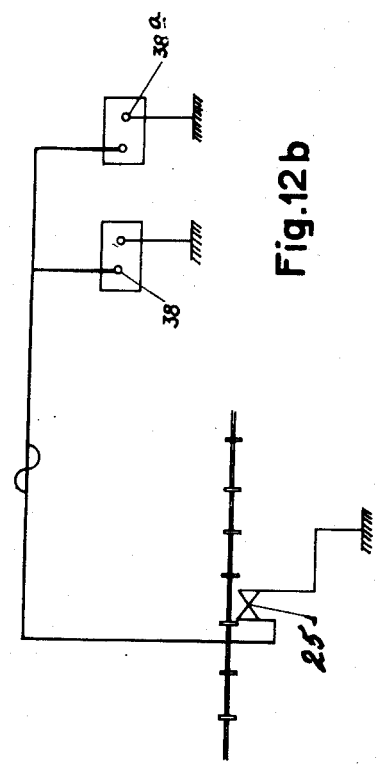

The electrically operated brakes 38 and 38a are energized when the contactor switch 25 is closed as shown in the circuit arrangement of Figs. 12, 12a, 12b.

The purpose of the jaws is to grasp the casings and wire when it is necessary to cause them to advance.

The motion of the carriage is ensured by a double connecting rod 40 the movement of which is related to the rotation of the cams 27 and 30. Cams 27 and 30 are carried on a common shaft 42, which also actuates double connecting rod 40.

The cycle of operations in the machine to which this invention relates is the following:

When the various parts of the machine are found in the position shown in Figs. 7, 8, 9, 10, 11, 12, which corresponds to the moment at which the dishing is finished, the contactor switch 25 is brought to its lowest point but is not engaged by an insulated block, thus the contactor remains open and the electrically operated brakes 28 and 38a are not energized, so that the jaws 35, 36, 37 grasp the casings and the wire 21 which are thus driven along by the carriage 32.

Figs. 7a, 8a, 9a, 10a, 11a, 12a show the position of the different parts of the machine at the instant in which, towards the end of the forward stroke, an insulating block strikes the contactor switch 25 which has approached the wire 21 under the action of the cam 27.

Then the contactor switch closes at once, the electrically operated brakes 38 and 38a become energized and actuated, the jaws 35, 36, 37 open and the forward motion of the casings and of the wire stops although the carriage 12 continues its unfinished course.

Figs. 7b, 8b, 9b, 10b, 11b, 12b show the position of the various devices at the instant of the dishing under the action of the cam 30, the jaws 35, 36, 37, being still open as the contactor switch is still closed by the thrust of the insulating block striking against it.

The carriage 32 returns over its course.

A moment afterwards, when the carriage 32 has reached the end of its return course, the dishing will be finished, the cam 30 having freed the dieholder which has been drawn back by the springs 31.

The jaws will grip the casings and the wire so that the cycle will be repeated.

The only regulation required on the machine is the correct positioning of the dishing press in relation to the contactor switch so that at the junction point of the casings and of the wire carrying the blocks, the latter may come to lie in the dished housings.

Such regulation is necessary because the wire moves with absolutely straight line movement whereas the casings move obliquely to the output of the pincers after passing over the two guides 41 and 41a.

What I claim is:

1. In a machine for making coaxial cable, a support having an input end and an output end, a reciprocating contactor displaceably mounted on said support, a vertically reciprocable press displaceably mounted on said support, a longitudinally reciprocable carriage slidably mounted on said support, a drive shaft rotatably mounted on said support, carriage displacing means connected to said carriage and longitudinally displacing the same, a first cam secured on said drive shaft and actuating said contactor, a second cam secured on said drive shaft and actuating said press, a third cam secured on said drive shaft and displacing said carriage displacing means, said shaft and said cams being arranged to hold said press open during the interval when said carriage is being longitudinally traversed, said carriage carrying a closable lateral jaw at each side thereof to receive metal strips, said carriage further carrying a closable central jaw in the center thereof receiving a central wire, electrical control means arranged and connected to set said jaws into gripping position and connected for actuation upon the closing of said contactor, and means mounted at the output end of said support to rotate a metal strip received from said lateral jaws through a right angle and further to then guide metal strips obliquely to apply the same to a central wire.

2. A machine according to claim 1, said carriage displacing means being a double connecting rod.

PAUL CHARLES EMARD.

References Cited in the file of this patent

UNITED STATES PATENTS

| Number | Name | Date |
|---|---|---|
| 2,469,565 | Logan | May 10, 1949 |

FOREIGN PATENTS

| Number | Country | Date |
|---|---|---|
| 552,392 | Great Britain | Apr. 6, 1943 |